United States Patent [19]

Hopkinson et al.

[11] Patent Number: 4,809,172
[45] Date of Patent: Feb. 28, 1989

[54] METHOD FOR OBTAINING IMAGE DATA WITH A TOMOGRAPHIC APPARATUS

[75] Inventors: James F. Hopkinson, Vernon Hills, Ill.; Kyojiro Nambu, Tochigi, Japan; E. Anne Sivers, Elmhurst, Ill.

[73] Assignee: Kabushiki Kaisha Toshiba, Kanagawa, Japan

[21] Appl. No.: 24,454

[22] Filed: Mar. 11, 1987

[51] Int. Cl.$^4$ ............................................. G06F 15/42
[52] U.S. Cl. .............................. 364/413.16; 364/571; 378/901
[58] Field of Search ........................ 364/414, 571, 574; 378/901

[56] References Cited

U.S. PATENT DOCUMENTS

| | | | |
|---|---|---|---|
| 4,458,358 | 7/1984 | Klausz | 364/414 |
| 4,550,371 | 10/1985 | Glover | 364/414 |
| 4,626,991 | 12/1986 | Crawford | 364/414 |
| 4,654,795 | 3/1987 | Shimoni | 364/414 |
| 4,654,796 | 3/1987 | Takagi | 364/414 |
| 4,707,786 | 11/1987 | Dehner | 364/414 |
| 4,712,178 | 12/1987 | Tny | 364/414 |
| 4,714,997 | 12/1987 | Crawford | 364/414 |
| 4,728,791 | 3/1988 | Goto | 364/414 |

Primary Examiner—Jerry Smith
Assistant Examiner—Gail O. Hayes
Attorney, Agent, or Firm—Finnegan, Henderson, Farabow, Garrett, & Dunner

[57] ABSTRACT

A method for obtaining image data for a target object with a tomographic apparatus in order to reconstruct a tomographic image of the target object. The method includes the step of determining correction constants for each detector of the tomographic apparatus.

The correction constants are determined as a function of the difference in performance of the tomagraphic apparatus when performing an air-wedge scan and when scanning a reference object. After the target object has been scanned, and the target object data calibrated against air-wedge scan data, the target object data is corrected using the correction constants. Data representing the difference between the calibrated target object data and the correction constants is used to reconstruct a tomographic image of the target object. The case where the target object is a human patient and the reference object is a water cylinder is considered. Use of the correction constants avoids the repeated scanning of water cylinders in order to calibrate the target object data.

31 Claims, 5 Drawing Sheets

WHERE [S(j)] DENOTES TRUNCATION TO NEAREST INTERGER.

∴ $P_{2C}(i,j) = P_2(i+[S(j)],j)(1-F) + P_2(i+[S(j)]+1,j)F$

WHERE $F = S(j) - [S(j)]$

METHOD FOR OBTAINING IMAGE DATA WITH A TOMOGRAPHIC APPARATUS

BACKGROUND OF THE INVENTION

I. Field of the Invention

This invention relates to a method for obtaining image data with a tomographic apparatus. More specifically, this invention relates to a method for obtaining calibrated image data, having reduced noise, for a target object in order to reconstruct a tomographic image of the target object.

II. Background Information

Conventional methods for obtaining image data for a target object with a tomographic apparatus include steps for calibrating the image data of the target object against image data obtained for a reference object. This calibration is performed in order to eliminate, from the image data for the target object, non-object-intrinsic information which may be contained within the image data as a result of the techniques utilized to obtain the image data using the tomographic apparatus.

Typically, a tomographic apparatus includes a radiation source for generating radiation beams, and a chamber through which these radiation beams are directed. The chamber of the tomographic apparatus includes a portion specifically adapted for receipt of an object. The tomographic apparatus further includes a plurality of individual detectors located opposite the radiation source for detecting radiation emerging from the chamber at various points, a data aquisition unit and a memory for storing data.

Image data for the target object may be obtained by placing the target object within the portion of the chamber adapted for receipt of an object, and subsequently subjecting the target object to radiation beams from the radiation source. The radiation from the radiation source will pass through the object and emerge from the chamber so as to be detected by the detectors positioned at various points opposite the radiation source. The intensity of each radiation beam emerging from the chamber will vary in accordance with the composition of the target object at the points through which each radiation beam has passed. Each detector responds to the emerging radiation detected at a given point by generating a response signal for the radiation detected at that point. The response signals are transferred to the data acquisition unit of the tomographic apparatus which generates image data for the target object. The image data is stored in the memory.

Unfortunately, for a variety of reasons the composition of the target is not accurately reflected by the emerging radiation which is detected by the detectors when the target object is placed in the chamber portion and subjected to radiation, i.e., scanned. Accordingly, the image data generated when the target object is scanned is inaccurate and not ideal for reconstructing a tomographic image of the target object.

One reason why the image data obtained by scanning the target object is not ideal is that a portion of the radiation used to obtain the image data is scattered by the target object. Scattered radiation is radiation which is not attenuated in proportion to the composition or density of the target object, and which does not emerge from the chamber at a position opposite the radiation source. Rather, scattered radiation is deflected by the target object, and emerges from the chamber at some position other than opposite the radiation source. A beam of radiation may be deflected by points inside the target object more than once or may be scattered by another radiation beam. A given detector detects undeflected beams emerging from the oppositely positioned radiation source along with deflected radiation incident on the detector. The detector cannot distinguish between deflected and undeflected radiation. The reconstruction mathematics, presumes, however, that the detector records only the radiation which is undeflected, and not also radiation which has been deflected. As a result, scattered radiation causes the generation of image data which falsely indicates dense target object composition. The typical target object scatters at least some measure of radiation.

Another reason for inaccurate image data may be the effect of off-focal radiation, i.e., the effect of radiation generated by a non-point radiation source. The generation of image data and the reconstruction of tomographic images is based on the idealization of a point source of radiation. Accordingly, if the radiation source is a non-point source, the data and reconstructed images will be to some degree inaccurate.

Yet another reason for inaccurate image data may be that the radiation from the radiation source is polychromatic X-ray radiation of mixed energy levels. The generation of image data and reconstruction of tomographic images is also based on the idealization of monochromatic radiation having a given energy level. Typical tomographic apparatus include radiation sources which are extended sources, that is, which are not point sources, and sources which emit polychromatic X-ray radiation, and typical tomographic apparatus would, therefore, produce inaccurate images from the target object image data. Other reasons for inaccurate image data such as, for example, differences between the detectors may also exist.

Present methods for obtaining image data mitigate against the effects of scattering, off-focal radiation, polychromaticity, and other undesirable effects, as those effects appear in the data obtained when scanning the target object, by also scanning a reference object and calibrating the data obtained for the target object against data obtained for the reference object. The reference object, which is chosen and scanned to obtain data for use in calibrating the data for the target object, typically has physical characteristics similar to the target object in so far as the characteristics of the target object and reference object are related to undesirable effects caused by, for example, scattering, off-focal radiation and polychromaticity.

For example, the target object may be a human patient or a portion of a human patient, the patient being scanned in order to produce a tomographic image for diagnostic use. In such a case, the reference object selected for use in calibrating the data of the target object is typically a cylinder of water having a size substantially similar to the size of the patient, i.e., to the "field size" for the target object. The physical characteristics of water are substantially similar to those of the human patient. Both the human patient and the water cylinder demonstrate substantially similar responses to off-focal polychromatic X-ray radiation, and both scatter radiation in a similar manner. Accordingly, by differencing the data obtained when scanning a water cylinder and a patient, the inaccuracies resulting when the human patient, that is, the target object is scanned and which are reflected in the image data for the human patient may be minimized, and more accurate calibrated image data obtained.

The water cylinder used when obtaining image data for a human patient is typically of uniform dimensions (wall thickness and diameter) throughout. The data generated for the cylinder is adjusted to achieve a flat or equivalent set of signal responses from the detectors, i.e., a flat profile. In order to achieve a flat profile, a compensation object, typically an aluminum wedge, which is concave where the water cylinder is convex, may be inserted in the tomographic apparatus chamber at a location between the radiation source and the portion of the chamber where the human patient would be placed.

Data obtained when the water cylinder is scanned, data obtained when the patient is scanned, and the water cylinder-calibrated image data or difference data, which is actually used to reconstruct a tomographic image of the patient, are stored in the memory of the tomographic apparatus. The tomographic apparatus also comprises a data processing unit, and differencing of the data for the water-cylinder scan and for the patient scan is performed by the data processing unit.

Each time a patient is scanned, a fresh set of data or profile is generated and stored. There is, however, much inconvenience associated with physically mounting water cylinders that is, with placing water cylinders in the portion of the chamber adapted for receipt of objects, and scanning the water cylinders. Therefore, a water cylinder scan is not performed each time a patient scan is performed. Instead, water cylinder scans are taken for various field sizes (e.g., five (5) different field sizes) and resulting water cylinder profiles are stored for use in obtaining calibrated image data for various patient scans.

The stored water cylinder profiles remain valid and useful for calibrating patient scan data only for a finite period of time, however. As various operatings parameters of the tomographic apparatus change, as when any alteration is performed in the radiation source optical assembly or with the detectors, the water cylinder profiles must be regenerated. Data for the water cylinder scan, that is, water cylinder profiles must also be regenerated to adjust for normal operating parameter changes of the tomographic apparatus not brought on by systematic alterations of the kind mentioned above. Accordingly, under the present methods utilized for obtaining image data, the inconvenient steps of physically mounting and scanning a water cylinder must be repeated with frequency as long as it is desired to reconstruct a tomographic image of a target object using calibrated image data, calibrated using a reference object with physical characteristics similar to those of the target object. This is so, notwithstanding the ability of the tomographic apparatus to store data.

In addition to the problem of repeated inconvenient mounting and scanning of water cylinders, further problems are encountered when using conventional methods to obtain calibrated image data for a patient using a water cylinder. One such problem is the high load which is placed on the radiation source when producing radiation of sufficient intensity to generate water cylinder profiles. A water cylinder causes significant attenuation of the radiation beams passing through the tomographic apparatus chamber and a water cylinder scan thus necessitates the production of high intensity radiation by the radiation source.

The noise present in the data obtained from scanning an object varies in accordance with the square root of N, $\sqrt{N}$, where N is the number of counts, or photons of radiation detected from a beam after it emerges from an object. The signal is directly proportional to the number of counts N. Accordingly, the signal to noise ratio is given by $N/\sqrt{N}=\sqrt{N}$, and noise increases as N increases. Since the water cylinder scan involves the production of high intensity radiation, that is, a high N value, the proportion of noise in data obtained from a water cylinder scan is high. The amount of noise present in the image data for the target object obtained using the water cylinder data is, therefore, also high, with the signal to noise ratio for the image data being undesirably low.

The signal to noise ratio for the image data may be improved by using a technique such as averaging the data from several water cylinder scans. The noise present in an averaged water cylinder profile decreases in proportion to the number of scans employed to obtained the averaged profile.

An important factor when obtaining the data from several water cylinder scans taken while rotating the radiation source, however, is the position of the water cylinder in the portion of the chamber for objects. If the water cylinder center is coincident with the center of the portion of the chambers, then as the radiation source is rotated the radiation source will remain the same distance from the water cylinder, and will thus cause the generation of water cylinder data for each detector which may be averaged with other data for the same detector. If, on the other hand, the water cylinder and portion centers are not coincident, distances between the source and the water cylinder for each of the several scans will vary. Data generated for each detector will be based on radiation travelling different distances from the radiation source to the water cylinder, and the data for each detector will, therefore, not be fit for averaging with other data for the same detector.

Conventional methods for averaging water cylinder profiles do not account for the uniqueness of the data generated by a detector as a function of the source-to-cylinder distance, however. This is true of conventional averaging methods even though the liklihood of placing a cylinder in the portion of the chamber so that the water cylinder and portion have coincident centers is quite low.

Conventional methods for averaging also fail to account for the varying sensitivities of the detectors of the tomographic apparatus as a function of the changed angular placement of the detectors relative to the water cylinder, i.e., angular sensitivity. Additionally, each water cylinder scan taken in order to obtained averaged water cylinder scan data requires the placement of a further high load on the radiation source.

Accordingly, an object of the present invention is to provide a method for obtaining calibrated image data for a target object with a tomographic apparatus, wherein the method does not require repeated scanning of a reference object to obtain data for use in calibrating the image data for the target object.

An additional object of the present invention is to provide a method for obtaining calibrated image data for a target object with a tomographic apparatus, wherein the image data for the target object is calibrated against calibration data which is updated in accordance with changes in operating parameters for the tomographic apparatus.

A still further object of the present invention is to provide a method for obtaining calibrated image data for a target object with a tomographic apparatus, wherein the method enables the target object image data to be calibrated against data obtained without placing a high load on the radiation source, and against data which still accounts for the type of scattering, off-focal radiation, and polychromatic effects which result when scanning the target object.

Yet a further object of the present invention is to reduce the noise present in the calibrated image data used to reconstruct a tomographic image of the target object.

Additional objects and advantages of the invention will be set forth in the description which follows, and in part will be obvious from the description or may be learned by practice of the invention.

SUMMARY OF THE INVENTION

To achieve the foregoing objects, and in accordance with the purpose of the invention as embodied and broadly described herein, there is provided a generic method for obtaining image data with a tomographic apparatus having a radiation source for generating radiation beams, a chamber through which the radiation beams are directed, the chamber having a portion adapted for receipt of an object, a plurality of individual detectors for detecting radiation emerging from the chamber and for generating response signals responsive to the detected radiation, a data acquisition unit for generating data representative of the response signals, a data processor and a memory, wherein the image data is used to reconstruct a tomograph image of a target object, the method comprising the steps of: determining a correction constant for each of the detectors for use in mitigating against inaccuracies in the representative data obtained using the individual detectors, and storing each correction constant; turning on the radiation source to direct radiation beams through the chamber when the portion of the chamber contains only air, detecting radiation beams emerging from the chamber and generating response signals thereto, and generating and storing first data representative of the response signals; placing the target object in the portion of the chamber, turning on the radiation source to direct the radiation beams through the chamber, detecting radiation beams emerging from the chamber and generating response signals thereto, and generating and storing second data representative of the response signals; differencing the first data and the second data to obtain third data representative of a difference between response signals for each of the detectors, and storing the third data; and differencing the third data and correction constants for each of the detectors to obtain image data to reconstruct a tomographic image of the target object. Also provided are two species methods comprising specific steps for determining a correction constant for each of the detectors.

DESCRIPTION OF THE PREFERRED EMBODIMENT

Figure 1:
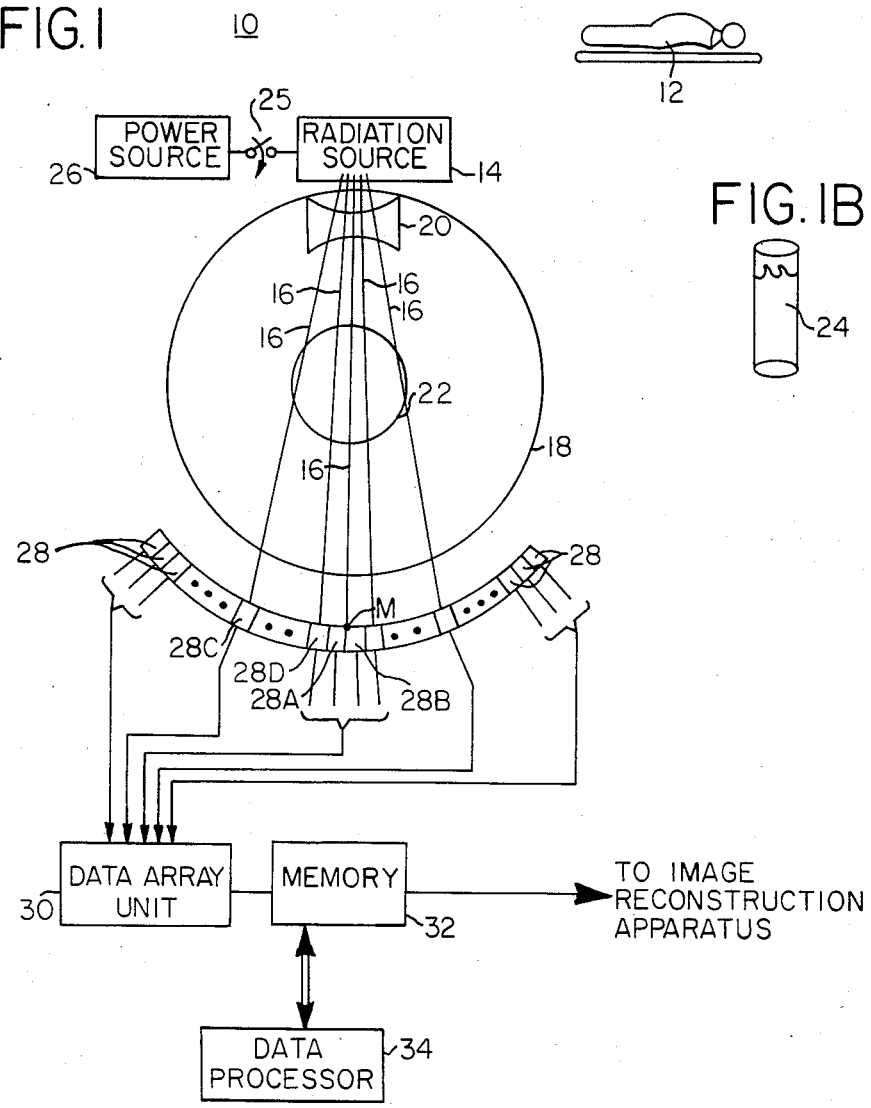
FIG. 1 illustrates a tomographic apparatus of the type which may be used in obtaining image data according to the method of the present invention.
Figure 1A:
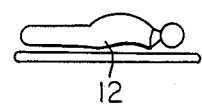
FIGS. 1A and 1B depict a human patient and a water cylinder, respectively.
Figure 1B:

Referring to FIGS. 1, 1A and 1B a generic method for obtaining image data with a tomographic appartus will be described. Two distinct methods, which are species of the generic method, will also be described with reference to FIGS. 1, 1A and 1B. The generic method and species methods may be implemented using, for example, a tomographic apparatus conforming to the general description provided below.

As shown in FIG. 1, a tomographic apparatus 10 which may be used in obtaining image data for a target object such as, for example, a human patient 12 or a portion of a human patient 12 (as shown in FIG. 1A) includes a radiation source 14 for generating radiation beams 16. Radiation beams 16 are directed through a chamber 18 which has placed therein an aluminum compensation object or wedge 20, and which also has a portion 22 specifically adapted for receipt of an object such as human patient 12 or a reference object which may be, for example, a water cylinder 24 (as shown in FIG. 1B). Radiation source 14 may be an extended radiation source of the type which emits off-focal radiation. Radiation source 14 may also be of the type for emitting X-ray radiation which is polychromatic. A power source 26 is connected with radiation source 14 by means of a switch 25 in order to turn on radiation source 14 to direct radiation beams 16 through chamber 18.

Aluminum wedge 20 is interposed between radiation source 14 and portion 22 of chamber 18, and limits the dynamic range of response signals generated by a plurality of detectors 28 which detect radiation emerging from chamber 18. Specifically, aluminum wedge 20 attenuates radiation from radiation source 14 in a manner so as to compensate for differences in path length of radiation beams 16 passing through an object (human patient 12, or a water cylinder 24) situated in portion 22 of chamber 18. The path length through the object for radiation beams 16 passing through the center region of the object is longer than the path length through the object for radiation beams passing through the peripheral regions of the object. Aluminum wedge 20 provides greater path length through aluminum wedge 20 for peripheral radiation, thereby limiting the intensity range of radiation beams 16 passing through chamber 18 and emerging therefrom. Accordingly, radiation beams 16 emerging from chamber 18, when detected by the plurality of individual detectors 28 which generate signals responsive to the radiation, cause detectors 28 to generate response signals having a limited dynamic range.

The response signals detected by individual detectors 28 are transferred to a data aquisition unit 30 which generates data representative of the received response signals. The representative data is subsequently transferred to a memory 32 which stores data, including data representative of response signals generated by detectors 28. The process of subjecting an object to radiation and generating representative data for storage in memory 32 is referred to as scanning. Data stored in memory 32 may be transferred to a data processor 34, processed and then transferred to memory 32 for storage.

The first step of the generic method of the present invention for obtaining image data is the step of determining a correction constant for each of a plurality of detectors. Specifically, with regard to the disclosed preferred embodiment, a set of correction constants, one constant for each of detectors 28, is subsequently stored in memory 32. The correction constant obtained for a detector 28 is used to correct or convert calibrated image data generated by that detector in response to receipt of radiation by that detector. The correction or conversion of image data is performed by differencing the correction constant for a detector 28 with calibrated image data generated by that detector. The differencing of the image data and conversion constant for that detector mitigates against undesirable effects such as scattering, off-focal radiation and polychromaticity, as these effects are captured in the image data generated by that detector. These effects are not specifically mitigated against by the steps for calibrating image data. Calibrated image data which has been corrected is used in reconstructing a tomographic image of a target object such as human patient 12.

More specifically, the correction constants, whether determined by performing actual scans or analytically, as described below, are determined as functions of various parameters, as for example, the energy of photons emitted by radiation source 14, the spectral distribution of the source radiation, and the distance travelled by radiation through aluminum wedge 20 and a target or reference object before reaching each detector 28.

In regard to the generic method of the present invention, the correction constants are also preferably determined as a function of the difference between the performance of a tomographic apparatus (that is, the difference in response signals generated by detectors 28 in the preferred embodiment) when an empty object-receiving portion of chamber, containing only air is scanned, and when the chamber contains a reference object such as a water cylinder placed in the object-receiving portion of the chamber and scanned. The determination of the correction constant as a function of the aforementioned performance difference is described in greater detail below. Data representative of this difference for each detector specifically captures scattering, off-focal radiation and polychromatic X-ray effects experienced by each detector when a reference object such as a water cylinder 24 of FIG. 1 is scanned so that these effects may be differenced from the image data for a target object such as human patient 12 when the target object is scanned. This difference also contains, typically, a noise portion which is a sum of the noise for an empty chamber scan and the noise for a water cylinder scan. The portion of the difference which is a result of noise may be reduced in a manner also described in greater detail below.

The correction constants for detectors 28 are determined independent of the specific tomographic apparatus to be used in obtaining the image data. That is, correction constants determined for a model of tomographic apparatus are applicable for all individual tomographic apparatus which are of the same model. Hence, correction constants for a tomographic apparatus model may be generated by the manufacturer and stored in memory 32 for use with each tomographic apparatus 10.

In the preferred embodiment, the correction constants are represented by the synmbol $P_2$. Specifically, $P_2$ symbolizes the set of correction constants, the set comprising a unique correction constant for each detector 28, where the number of detectors, and accordingly, the number of unique correction constants comprising the correction constant set $P_2$, may be, for example, 2048. The correction constant for any detector 28 is given by the difference between the LOG of the data generated by that detector or expected to be generated when empty chamber 18 is scanned and the LOG of the data generated by that detector or expected to be generated when water cylinder 24 is placed in portion 22 of chamber 18 and water cylinder 24 is scanned. Log data is used to facilitate later processing of image data when the tomographic image of the target object is reconstructed. The set of correction constants $P_2$ may be expressed as follows:

$$P_2 = Ln(P_A) - Ln(P_W), \tag{1}$$

where $Ln(P_A)$ represents the LOG of data generated by detectors 28 for a scan of chamber 18 not containing an object, i.e., the LOG of an air-wedge profile, and where $Ln(P_W)$ represents the LOG of data generated by detectors 28 for a scan of chamber 18 containing a water cylinder, i.e., the LOG of a water-wedge profile. Each correction constant for a detector 28 of the set of correction constants $P_2$ is obtained by differencing the LOG of the air-wedge and water-wedge data generated by that specific detector. Therefore, equation (1) may also be expressed as:

$$P_2(d) = Ln(P_A(d)) - Ln(P_W(d)),$$

where d denotes a data value generated by a specific one of detectors 28. (Aluminum wedge 20 remains in chamber 18 at all times. Hence the data sets obtained for the scan of chamber 18 when portion 22 is empty and the scan of water cylinder 24 are referred to as air-wedge and water-wedge profiles, respectively.) The air-wedge and water-wedge profiles may be obtained either by actually performing empty chamber and water cylinder scans, respectively, or by analytically computing profiles for the scans. These distinct methods for obtaining the air-wedge and water-wedge profiles and thus for obtaining the correction constants $P_2$ *define two species methods of the generic method of the subject invention.*

After correction constants $P_2$ have been determined and stored, and other steps comprising the method for obtaining image data for reconstructing a tomographic image may be performed. The first step to be performed, once correction constants $P_2$ have been determined, is to obtain data against which data for human patient 12, the target object, may be calibrated, i.e., calibration data.

As described below, the step of obtaining calibration data does not involve repeated scanning of water cylinders and is, therefore, not difficult to perform. Because repeated scanning of water cylinders is not involved in obtaining calibration data, a reduction in the noise portion of the image data is achieved.

According to the generic method of the present invention, data against which data for human patient 12 is calibrated is obtained by turning on radiation source 14 to direct radiation beams 16 through chamber 18. Specifically, radiation beams 16 are directed through aluminum wedge 20 and portion 22 of chamber 18 at a time when portion 22 has been emptied to contain only air. Detectors 28 detect the radiation emerging from chamber 18 and generate signals responsive to the emerging radiation. Data acquisition unit 30 generates data representative of the response signals from detectors 28 and transfers the data to memory 32. The data generated, i.e., the air-wedge profile, is reflective of the operating parameters of the tomographic apparatus at the time of the scan. The air-wedge profile is easily generated since doing so does not involve the physical mounting of any object. Furthermore, because air does not significantly attenuate radiation beams 16 passing through chamber 18, the load on radiation source 18 when scanning empty chamber 18 is not high. Since the load on radiation source 18 is not high for the empty chamber scan, the noise in the air-wedge profile is reduced. The LOG of the data obtained when scanning empty chamber 28 is used to calibrate image data for human patient in a manner set forth below. As with the air-wedge component of correction constants $P_2$, the LOG of data generated by detectors 28 for empty chamber 18 is represented by $Ln(P_A)$.

After calibration data in the form of the air-wedge profile is obtained, the target object, human patient 12, is scanned to obtain data for the target object, i.e., a patient-wedge profile. The LOG of the data generated by detectors 28 when human patient 12 is scanned is represented by $Ln(P_p)$. The data represented by $Ln(P_p)$ is stored in memory 32 and subsequently used to obtain calibrated image data for human patient 12.

Calibrated image data for human patient 12 is obtained in the next step of the method for obtaining the image data used to reconstruct a tomographic image of human patient 12. The calibrated image data is obtained by differencing the LOG of the patient-wedge profile from the LOG of the air-wedge profile obtained by scanning empty chamber 18. The difference is represented by the symbol $P_1$. The set of calibrated image data for detectors 28, i.e., $P_1$ may be expressed as follows:

$$P_1 = Ln(P_A) - Ln(P_p). \qquad (2)$$

$P_1$ is obtained for any one of detectors 28 by differencing the log of the air-wedge and patient-wedge data generated by that detector.

Since the air-wedge and patient-wedge profiles do not respond to polychromatic X-ray radiation in the same manner, and do not scatter radiation in a similar manner, the calibrated image data will demonstrate undesirable effects such as polychromatic doming. Polychromatic doming is the visual result of using polychromatic radiation, the effect of which is seen in a reconstructed tomographic image. As described above, however, such effects are minimized by correcting the calibrated image data using correction constants $P_2$.

Image data which has been caibrated against an air-wedge profile and corrected using correction constants $P_2$ is used to reconstruct a tomographic image of human patient 12. This data is represented by the symbol $\bar{P}$, where $$\bar{P} = P_1 - P_2. \qquad (3)$$

Since $P_1$ and $P_2$ involve calibrations of the target object data and reference object data, respectively, against air-wedge data, the basic calibration of a target object against a reference object (as described in the Background of this application) is preserved in the method described. (See equations (1), (2) and (3).) $\bar{P}$ is obtained for any one of detectors 28 by differencing the value of $P_1$ and $P_2$ for that detector.

The noise present in the calibrated patient-wedge profile $P_1$ and in correction constants $P_2$ are given by the square root of the variances for $P_1$ amd $P_2$, respectively. The variances for $P_1$ and $P_2$ are represented by the symbols $(\sigma P_1)^2$, $(\sigma P_2)^2$, respectively. The noise present in the corrected and calibrated image data $\bar{P}$ is similarly given by the square root of the variance for $\bar{P}$. The variance for $\bar{P}$, represented by $(\sigma \bar{P})^2$, is equal to the sum of the variances for $P_1$ and $P_2$. This is shown by the equation:

$$(\sigma \bar{P})^2 = (\sigma P_1)^2 = (\sigma P_2)^2 \qquad (4)$$

Accordingly, to minimize the noise in $\bar{P}$, and thereby improve the ability of the tomographic apparatus to accurately and sharply reproduce low contrast images (i.e., to improve "low contrast detectability"), the noise in either or both $P_1$ and $P_2$ should be reduced. The noise present in $P_1$ is already reduced, to an extent, because a low-load air-wedge scan is used to obtain the air-wedge calibrated patient-wedge profile. Further reduction may be achieved by further reducing the noise in $P_1$ or by reducing the noise in correction constants $P_2$. The species methods of the present invention further reduce the noise in $\bar{P}$ by reducing the noise in correction constants $P_2$.

The noise in correction constants $P_2$ may be reduced by obtaining correction constants which have been "smoothed". Corrections constants are smoothed if the step of determining correction constants $P_2$ for each of detectors 28 further includes the substep of scanning portion 22 of chamber 18, when portion 22 is empty, and of scanning water cylinder 24 a plurality of times, to obtain a plurality of sets of correction constants $P_2$, and if the step of determining correction constants $P_2$ further includes the substep of averaging sets of correction constants. Alternatively, correction constants $P_2$ are smoothed if data sets $Ln(P_A)$ and $Ln(P_w)$, used to obtain correction constants $P_2$, are computed analytically. Species methods of the present invention are defined by these separate techniques for obtaining smoothed correction constants.

A difficulty is posed when performing a plurality of air-wedge and water-wedge scans to obtain an averaged set of correction constants $P_2$, however, in that radiation source 14 is preferably repositioned for each pair of air-wedge and water-wedge scans. That is, as each pair of air-wedge and water-wedge scans is performed, radiation source 14 is preferably rotated about chamber 18 so that radiation source 14 is in a different position relative to chamber 18 for each pair of scans. By repositioning radiation source 14, noise intrinsic to any particular scanning position and present in the scan data obtained when radiation source 14 is in that position may be averaged with noise in data obtained when radiation source 14 is in other positions. The noist present in the averaged data is thereby reduced. Sets of correction constants $P_2$ based on pairs of scans which are obtained while rotating radiation source 14 are properly averaged, however, only if water cylinder 25 is perfectly centered in portion 22 of chamber 18 when the water-wedge scans are performed. Rotation of radiation source 14 when water cylinder 24 is not perfectly centered, causes the generation of correction constants which are based on radiation having different path lengths to and from water cylinder 24 and different path lengths through water cylinder 24 for each pair of scans. The correction constants for each pair of scans are, therefore, unique to the position of radiation source 14 and cannot be averaged with sets of correction constants $P_2$ for other pairs of scans which are also unique to particular positions of radiation source 14.

Figure 2:
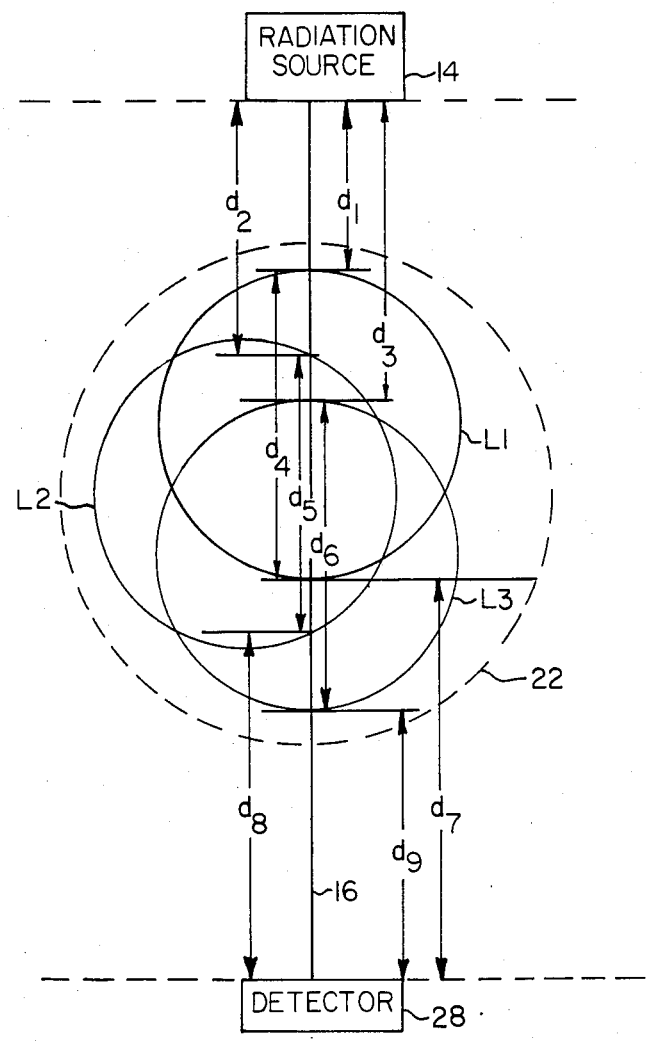
FIG. 2 is an illustration of the position of a rotation radiation source relative to a water cylinder in the chamber of a tomographic apparatus.

As shown in FIG. 2, as radiation source 14 is rotated about a water cylinder 24, which is not centered in portion 22 of chamber 18, the location of water cylinder 24 with respect to radiation source 14 changes. A first location L1, a second location L2 and a third location L3 of water cylinder 24 are shown in FIG. 2. A radiation beam 16 passes from radiation source 14 through water cylinder 24 to an oppositely positioned detector 28 each time water cylinder 24 is scanned. Because water cylinder 24 is not centered the path lengths of radiation beam 16 to detector 28 are different for each scan. Distances $d_1$, $d_2$ and $d_3$, the path lengths from source 14 to water cylinder 24, are different for each location L1, L2 and L3, respectively. Distances $d_4$, $d_5$ and $d_6$, the path length through water cylinder 24 for location L1, L2 and L3, respectively, are also different, as are the path lengths $d_7$, $d_8$ and $d_9$ from water cylinder 24 to detector 28 for locations L1, L2 and L3, respectively.

As a result, the intensity of the radiation incident on detector 28 when uncentered water cylinder 24 is scanned varies for each location of water cylinder 24. The scan data generated for scans at the different locations also varies. Because the radiation intensity and scan data for the different locations are different, that is, not reflective of an identically positioned water cylinder 24, an essential similarity, except as to position-unique noise, does not exist between the scans for the different locations. Accordingly, the data for the different scans cannot be averaged to reduce noise.

To overcome the difficulty posed when a plurality of scans is performed with an uncentered water cylinder, the species method, which includes the substeps of performing a plurality of scans and averaging the correction contants obtained thereby, further includes a substep for aligning each set of correction constants from each pair of air-wedge and water-wedge scans to obtain sets of correction contants which may be averaged to achieve a noise reduction for an averaged set of correction constants. By aligning each set of correction constants $P_2$, each given correction constant associated with a detector 28 is shifted so as to be associated with another detector 28 expected to be associated with that given correction constant if water cylinder 24 is centered. The correction constants $P_2$ to be aligned are obtained in the same manner as earlier described, i.e., by differencing the LOG of the air-wedge and water-wedge profiles for each pair of scans. (See equation (1).)

According to the species method described above, radiation source 14 is turned on a plurality of times to first scan empty portion 22 of chamber 18 and then to scan water cylinder 24 when water cylinder 24 is placed in portion 22. Radiation source 14 is repositioned for each pair of scans. Data obtained when performing the scans is utilized in accordance with equation (1) to obtain correction constants $P_2$.

Each set of correction constants $P_2$ for each pair of scans is aligned so that an averaging of corrections constants $P_2$ for difference scan pairs may be performed. The substep of aligning correction constants $P_2$ also serves to reduce the effects of the angular sensitivity of individual detectors 28, which would distort data obtained when radiation source 14 is repositioned to scan an uncentered water cylinder 24.

The align correction constants $P_2$ obtained for any pair of air-wedge and water-wedge scans, the number of data values obtained for profiles must be known. The number of data values may be, for example, 2048 where the number of detectors 28 is also 2048. In such a case, with a centered water cylinder 24, radiation passing through the center of water cylinder 24 and therefore experiencing maximum attenuation will emerge from chamber 18 and arrive at a point M as shown in FIG. 1. Point M is located midway between the 1024th and 1025th of the 2048 detectors 28, respectively designated by the symbols 28A and 28B in FIG. 1. A water-wedge profile would then be expected to show maximum attenuation in the data values generated from the response signals of detectors 28A and 28B. A profile obtained with an uncentered water-cylinder 24 may be shifted, or aligned, so that the point of maximum attenuation for the profile appears to occur at the same location as with a profile for a centered water cylinder 24, at point M. Point M is at a location specified by a "real ray index" of 1024.5.

To shift profiles, as, for example, profiles comprising sets of correction constants $P_2$ obtained for an uncentered water-cylinder, the degree of displacement separating, for example, a detector 28C, which generates given data from, for example, a detector 28D which would generate that data, with water cylinder 24 centered is first determined for each set of correction constants $P_2$.

The degree of displacement for each set of correction constants $P_2$ obtained by scanning and differencing data for an empty chamber portion 22 and a water cylinder 24 is determined by computing a relative center of mass of water cylinder 24.

The relative center of mass is computed from the values comprising a set of correction constants $P_2$ and is used to arrive at the degree of displacement by means of the following formula:

$$S(k) = \frac{\sum_{i=-N}^{+N} i \times P_2(i + 1024, k)}{\sum_{i=-N}^{+N} P_2(i + 1024, k)}, \tag{5}$$

where N is the number of rays or radiation beams 16 required to fully scan water cylinder 24. The number of rays N may be increased in accordance with an increase in the number of rays or radiation beams 16 beyond the minimum needed to scan water cylinder 24.

The symbol i represents a ray location. Each of detectors 28 of tomographic apparatus has a ray location relative to radiation source 14. The symbol k specifies with which of the 2048 detectors 28 a given correction constant $P_2$ is associated. Equation (5) indicates that any individual correction constant $P_2$ for a detector 28 (specified by k, where 1 k 2048) is a function of the ray location i of the detector and of the detector itself. S(k) is the degree of displacement between, for example, detector 28C generating and having associated therewith given data and, for example, detector 28D which would generate that given data with water cylinder 24 centered in portion 22 of chamber 18. As stated, the degree of displacement is given in ray index units.

Values for the degree of displacement for detectors 28 of a profile should be a smooth function. A smooth function may be obtained from S(k) for a profile or set of correction constants $P_2$ using the finite Fourier series represented by S( ), where $$S(\theta) = a_0/2 + a_1 \cos\theta + a_2 \sin\theta. \quad (6)$$

The angle $\theta$ is equal to $k\Delta\theta$ where k is the detector index and $\Delta\theta$ is the ideal angular separation between detectors 28. The Fourier coefficients $a_n$ are calculated according to the following formula:

$$a_n = \frac{1}{\pi} \int S(\theta) \begin{cases} \cos(n\theta); & n=0,1 \\ \sin(nk\theta); & n=2 \end{cases} d\theta \simeq$$

$$\frac{2}{NDET} \times \sum_{K=1}^{NDET} S(k\Delta\theta) \begin{cases} \cos(nk\Delta\theta); & n=0,1 \\ \sin(nk\Delta\theta); & n=2 \end{cases}, \quad (7)$$

where NDET is the number of detectors 28.

Once the degree of displacement between detectors has been obtained for each set of correction constants $P_2$, the data for each set of constants is aligned in a manner as if the correction constants $P_2$ had been obtained using a centered water cylinder 24. That is, each of the constants is shifted by degree of displacement S(k) as to be associated with a detector 28 in a manner as for a cylinder-centered profile. Subsequently data for each set of correction constants $P_2$ obtained with a pair of scans for each detector 28 is accumulated with the corresponding data in each other set of constants for averaging. The centered data comprising a set of correction constants $P_2$ for any ray location i, as detected by a detector 28, is denoted $P_{2C}(i, k)$ which is equivalent to the data for uncentered data displaced S(k) ray units from $P_2(i,k)$. Accordingly, the data for the centered profile is expressed as follows:

$$P_{2C}(i,k) = P_2(i+S(k),k). \quad (8)$$

Figure 3:
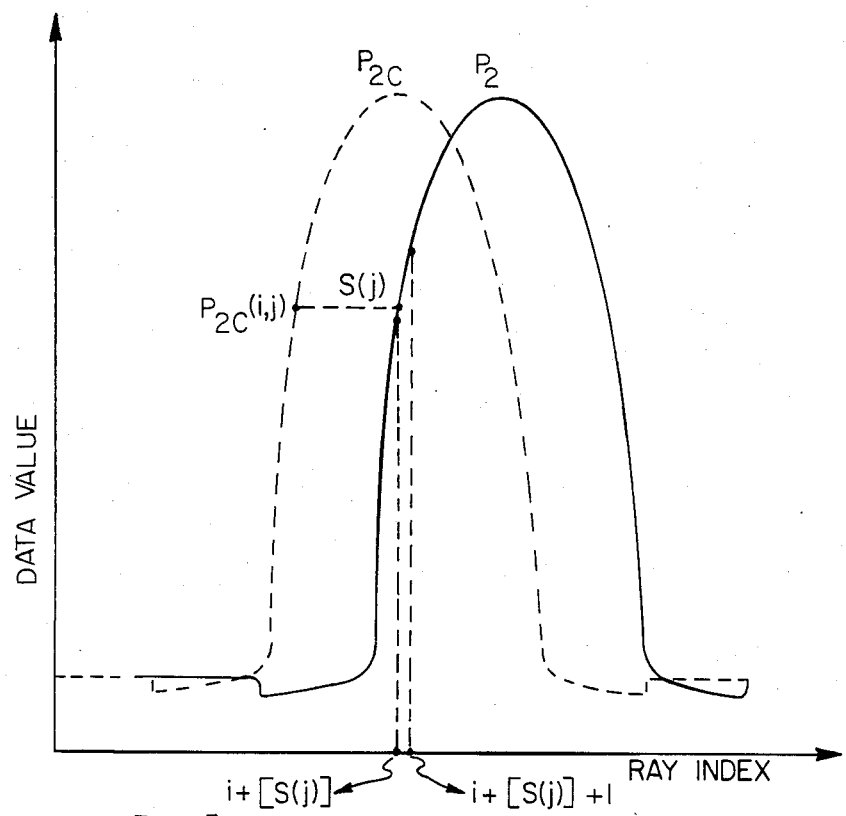
FIG. 3 is a diagram illustrating a method for interpolating scan data according to a species method of the present invention for obtaining image data.

The value $i+S(k)$ is likely real, that is, non-integer, representing locations in between two detectors. Detector locations are represented by integer values of i. By a substep of linear interpolation, correction constants $P_{2C}(i+S(k), k)$ for any real $(i+S(k))$ may be obtained. Linear interpolation for any real $(i+S(k))$ is performed between data values for the two detectors having integer ray index locations nearest a real ray index location (i,k) which is displaced S(k) ray units from $(i+S(k),k)$. Referring to FIG. 3, a substep of linear interpolation which is performed to obtain $P_{2C}(i,k)$ for real i is described.

In connection with FIG. 3, j is used as the detector index. Accordingly, a set of correction constants $P_2$ is displaced S(j) ray index units from the centered correction constants $P_{2C}$. A point $P_{2C}(i,j)$ on curve $P_{2C}$ represents a correction constant having a real value for the ray index i. Integer values $(i+[s(j)])$ and $(i+[S(j)]+1)$ of ray index i denote the integer values for i nearest real ray index location $i+S(j)$. The symbols $[S(j)]$ denote a truncated integer value of the real value S(j). A factor F is obtained from the difference between the displacement S(j) and the truncated value for the displacement $[S(j)]$. Subsequently, the interpolation is performed by obtaining a sum for $P_{2C}(i,j)$ having a portion of the value for each of correction constants $P_2$ for the detectors 28 having integer ray index values $i+[S(j)]$ and $i+[S(j)]+1$. Specifically, $$P_{2C}(i,j) = P_2(i+[S(j)],j) \times (1-F) + P_2(i+[S(j)]+1,j) \times F. \quad (9)$$

After the centered-shifted correction constants $P_2$ for a plurality of scan pairs have been obtained, a simple averaging of sets of correction constants $P_2$ for each scan pair is performed to achieve a noise reduction. Noise is reduced by a factor inversely proportional to the square root of the number of sets of correction constants $P_2$ which are averaged.

Where $(\sigma_{p,k})^2$ is used to denote the variance in correction constants $P_2$ for any kth pair of scans, the variance for an average of K pair of scans is given by:

$$(\sigma_p)^2 = 1/K^2 \times \sum_{k=1}^{K} (\sigma_{p,k})^2. \quad (10)$$

Assuming that the techniques for the scans is the same, the variance becomes:

$$(\sigma_p)^2 = 1/K(\sigma_{p,1})^2, \quad (11)$$

which is the same as the noise for any individual scan pair as, for example the first scan pair. The noise for the averaged set of correction constants, being the square root of the variance, is therefore given by:

$$(\sigma_p) = 1/(K)^{(\frac{1}{2})} \times (\sigma_{p,1}). \quad (12)$$

The processing of data including differencing air-wedge and water-wedge profiles, determining degree of displacement, interpolating, and averaging is performed by data processor 34. Averaged, or smoothed correction constants $P_2$ are stored in memory 32 for use in correcting calibrated image data. The plurality of air-wedge and water-wedge scans necessary for obtaining an averaged set of correction constants $P_2$ may be performed infrequently as, for example, by the manufacturer after tomographic apparatus 10 has been manufactured, and after any significant changes have taken place in tomographic apparatus 10. As described above, the effect of normal operating parameter changes are accounted for by the air-wedge profiles against which the patient-wedge profiles are calibrated to obtain calibrated patent-wedge profile $P_1$.

Alternatively, according to another species method of the present invention, smoothed correction constants $P_2$ may be obtained by differencing analytically computed values for $Ln(P_A)$ and $Ln(P_W)$. Using Beer's Law, extended to consider polychromatic radiation and detector responses, the analytically computed air-wedge data and water-wedge data for a ray index location n, $P_A^T(n)$ and $P_W^T(n)$, respectively, are expressed as follows:

$$P_A^T(n) = \int_{\epsilon min}^{\epsilon max} s(\epsilon) \times \epsilon \times e^{-\mu(\epsilon)X(n)} d\epsilon, \quad (13)$$

and $$P_w^T(n) = \int_{\epsilon min}^{\epsilon max} s(\epsilon) \times \epsilon \times e^{-\mu(\epsilon)X(n) - \mu'(\epsilon)X'(n)} d\epsilon. \quad (14)$$

The symbols utilized in equations (13) and (14) are as defined below, where $\epsilon$ = photon energy for photons contained in the radiation beams from the source, $\epsilon_{min}$ = energy of the least energetic photon produced by the source, $\epsilon_{max}$ = energy of the most energetic photon produced by the source, $s(\epsilon)$ = energy dependent X-ray spectral distribution, $\mu(\epsilon)$ = energy dependent linear attenuation coefficient for the compensation (or aluminum) wedge, $X(n)$ = path length of a ray from the source ray index location through the compensation wedge, $\mu'(\epsilon)$ = energy dependent linear attenuation coefficient of water, $X'(n)$ = path length of a ray from the source to ray index location n through a centered water cylinder.

In practice, the integrals for $P_A^T(n)$ and $P_W^T(n)$ shown in equations (13) and (14), respectively, may be evaluated using a standard discrete numerical integration technique such as, for example, Simpson's Rule. Using Simpson's Rule, $P_A^T(n)$ and $P_W^T(n)$ may be approximated by:

$$P_A^T(n) = \sum_{i=1}^{N} D(i) \times s(\epsilon_i) \times \epsilon_i \times e^{-\mu(\epsilon_i) \times X(n)} \quad (15)$$

and $$P_w^T(n) = \sum_{i=1}^{N} D(i) \times s(\epsilon_i) \times \epsilon_i \times e^{-\mu(\epsilon_i) \times X(n) - \mu'(\epsilon_i) \times X'(n)} \quad (16)$$

where N = an odd integer, i = a discrete photon energy in the photon energy interval under consideration from $\epsilon_i$ to $\epsilon_N$, $$D(i) = \begin{cases} \frac{h}{3} & \text{if } i = 1 \text{ or } i = N \\ \frac{4h}{3} & \text{if } i \text{ is even} \\ \frac{2h}{3} & \text{if } i \text{ is odd,} \end{cases} \quad (17)$$

and $$h = \frac{\epsilon_{max} - \epsilon_{min}}{N - 1}$$

Accordingly, in order to obtain $P_A^T(n)$ and $P_W^T(n)$ the X-ray spectral distributions, $s(\epsilon)$, the energy dependent linear attenuation coefficients, $\mu$ and $\mu'$ (of water and the compensation wedge, respectively), and th path lengths of a ray through a centered water cylinder 24 and through the compensation wedge 20 are required. Also required are values for photon energies, $\epsilon$. Methods for obtaining this information are described below.

Ideally, X-ray spectrometry could be done to directly determine the X-ray spectral distribution $s(\epsilon)$ for any specific X-ray tube type comprising radiation source 14. An example of such an approach for determining $s(\epsilon)$ is described in *Diagnostic X-Ray Spectra* by Gudmund Svahn, (Ph.D. dissertation), Sweeden, Gotab, Malmo 1977.209. Direct determination of $s(\epsilon)$ is usually costly and complex, however. Therefore, other approaches are often sought for determining $s(\epsilon)$.

Given the anode composition of the X-ray tube of radiation source 14, the beam path lengths through the X-ray tube, and the nominal operating tube voltage, an approximate continuum spectrum may be mathematically derived using Bremstrahlung theory. K peaks locations and their relative strengths can be included with support from experimental data. A detailed description of this method is provided in "Computation of Bremstrahlung X-ray Spectra and Comparison with Spectra Measured with A Ge (Li) Detector", by R. Birch and M. Marshall, *Phys. Med. Biol.*, (1979), Vol. 24, No. 3, pp. 505-517.

Detailed spectral information may also be obtained from analysis of attenuation data. This method is generally based on the observation that the attenuation and the spectral distribution may be written as a Laplace transform pair. Analytic functions are used to fit the attenuation data. The inverse Laplace transform is then performed to generate the X-ray spectral distribution $s(\epsilon)$. Representative examples of this procedure are set forth in "A Laplace Transform Pair Model for Spectral Reconstruction", by Benjamin R. Archer *Med. Phys.*, 9 (6) November/December 1982, and "Determination of X-ray Spectral Including Characteristic Line Intensities from Attenuation Data", *Phys. Med. Biol.*, (1984), Vol. 29, No. 11, pp. 1371-1376.

Experimental data on the energy dependence of the X-ray attenuation coefficients of elements and various compounds is widely published. Examples of such experimental data may be found in the following references:

W. H. McMaster, N. Kerr Del Grande, J. H. Hallet, J. H. Hubbell, "Compilation of X-ray Cross Sections", Lawrence Radiation Laboratory, UCRL-50174, May, 1969;

The Hospital Physicists' Association (Radiotherapy Topic Group), "Phantom Materials for Photons and Electrons", Scientific Report Series-20, 1977, appendix 1; and M. E. Phelps, E. J. Hoffman, M. Ter-Pogossian, "Attenuation Coefficients of Various Body Tissues, Fluids, and Lesions at Photon Energies of 18 to 136 KEV." *Radiology*, Vol. 117, December, 1975, pp. 573-583.

The attenuation coefficients ($\mu$) or ($\mu'$) at any specific photon energy ($\mu$) may be obtained from discrete experimental values by using smooth interpolation methods such as cubic spine interpolation.

Figure 4:
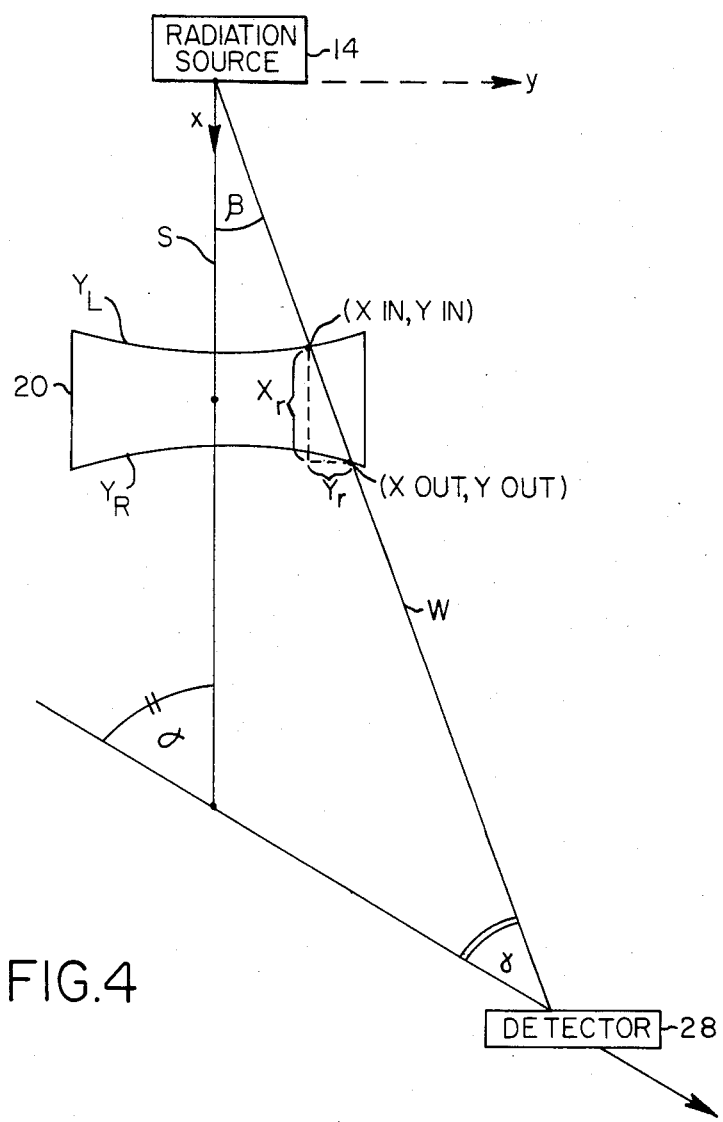
FIG. 4 is a diagram illustrating the determination of quantities to be used in obtaining image data according to another species method of the present invention.

As mentioned previously, the shape of the compensation or aluminum wedge 20 is chosen to produce a flat (dynamic range-limited) profile when scanning water cylinder 24. Referring to FIG. 4, curves defining the surfaces of aluminum wedge 20 are specified by $Y_L$ and $Y_R$. Curves $Y_L$ and $Y_R$ may be given as functions, $Y_L = f(x)$ and $Y_R = g(x)$, or, more typically as sets of x, y coordinate pairs. In either case, since the wedge shape profile is known, it is possible to compute ray path lengths X(n) through the wedge.

The first step in computing the ray path lengths is to establish a ray angle $\beta$ for a ray or radiation beam 16 passing through aluminum wedge 20. Ray angle $\beta$ is the angle between a ray W directed from radiation source 14 to a detector 28 (the response of which is being determined) and a line S from source 14 through the center of aluminum wedge 20. In order to compute ray angle $\beta$, a source angle $\alpha$ and a detector ray angular location $\gamma$, as shown in FIG. 4, are used. Source angle $\alpha$ and angular location $\gamma$ are angles between a y-axis through detector 28 and line S and ray W, respectively. With the source 14 at the origin of the coordinate system shown in FIG. 4, the equation of the line representing the ray traversal is given by:

$$Y_r = (\tan \beta) \times X_r \tag{18}$$

The entrance or exit of a ray to or from aluminum wedge 20 is at the coordinates $(X_{in}, Y_{in})$ or $(X_{out}, Y_{out})$, respectively. In the case that the shape of aluminum wedge 20 is known, the Cartesian coordinate pairs $(X_{in}, Y_{in})$ may be found from the roots of the equations:

$$Y_R - Y_r = 0 \tag{19}$$

and $$Y_L - Y_r = 0. \tag{20}$$

Alternatively, ray path lengths $X(r)$, as a function of $\gamma$, may be calculated based on the equation $$X(\gamma) = ((X_{in} - X_{out})^2 + (Y_{in} - Y_{out})^2)^{\frac{1}{2}}. \tag{21}$$

Figure 5:
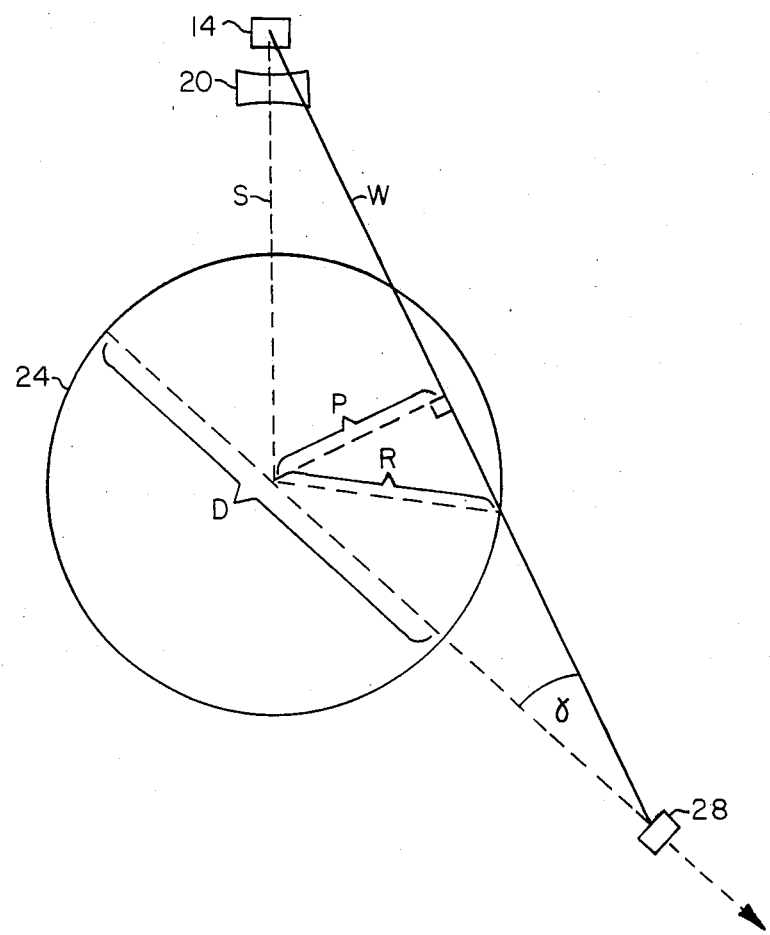
FIG. 5 is a diagram further illustrating the determination of quantities to be used in obtaining image data according to same species method of the present invention referenced in the description of FIG. 4.

The determination of ray path lengths through centered water cylinder 24 is straight forward. The ray path lengths are given by the following equation:

$$X'(\gamma) = (R^2 - D^2 \sin^2 \gamma)^{\frac{1}{2}} \tag{22}$$

where, as shown in FIG. 5, R is the radius of a water cylinder 24 and D is the distance from a detector 28 to the center of water cylinder 24 which, ideally, is coincident with the center portion 22 of chamber 18.

After the information concerning the spectral distribution, attenuation coeeficients, and ray lengths have been determined, this information is utilized to evaluate $P_A{}^T(n)$ and $P_W{}^T(n)$ in accordance with equations (15) and (16.)

As described by equation (1), correction constants $P_2$ are obtained by differencing the LOG of the air-wedge and patient-wedge profiles. In this instance, the LOG of the analytically computer air-wedge profile, denoted by $P_A{}^T(n)$, the LOG of the analytically computer water-wedge profile, denoted by $P_W{}^T(n)$, are differenced to obtain correction contants $P_2$. Correction constants $P_2$ are stored in memory 32 for subsequent use. Because correction constants $P_2$ have been analytically computed, the correction constants $P_2$ are devoid of the noise which is present when actual air-wedge and water-wedge scans are performed. The computation of correction constants $P_2$ may be performed once by the manufacturer after tomographic apparatus 10 has been manufactured. Again, as described above, the effect of normal operating parameter changes are accounted for by the air-wedge profiles against which the patient-wedge profiles are calibrated.

Analytical computation of correction constants $P_2$ eliminates the need for initial and possibly subsequent, occasional water-wedge scans as performed when using the averaging method for determining correction constants $P_2$. Furthermore, with the analytical computation method, a profile of correction constants $P_2$ may be produced for any arbitrary independent selection of a compensation wedge or water cylinder.

Whether the species method for averaging aligned actual water-wedge scan data or the species method of analytical computation is used to determine correction constants $P_2$, a noise reduction over the noise present in water-wedge profiles obtained by conventional techniques is achieved. Moreover, because the correction constants $P_2$ obtained by either of these species methods corrects patient scans to minimize undesirable effects, the need for frequently obtaining water-wedge profiles and placing high loads on radiation source 14 in order to calibrate image data of patient-wedge profiles is eliminated.

The corrected and calibrated image data $\bar{P}$ for any image of human patient 12, obtained using equation (3), is stored in memory 32. Subsequently, the data may be, for example, convolved and back projected in the conventional manner to reconstruct a tomographic image of human patient 12.

It should be apparent to those skilled in the art pertaining to methods and apparatus discussed here that various modifications may be made to the generic method and species methods of the subject invention without departing from the scope or spirit of the invention. Thus, it is intended that the invention cover modifications and variations of the invention, provided they come within the scope of the appended claims and their legally entitled equivalents.

We claim:

1. A method for obtaining image data with a tomographic apparatus having a radiation source for generating radiation beams, a chamber through which said radiation beams are directed, said chamber having a portion adapted for receipt of an object, a plurality of individual detectors for detecting radiation emerging from said chamber and for generating response signals responsive to said detected radiation, a data acquisition unit for generating data representative of said response signals, a data processor and a memory, wherein said image data is used to reconstruct a tomographic image of a target object, said method comprising the steps of:

determining a correction constant for each of said detectors for use in mitigating against inaccuracies in said representative data obtained using said individual detectors, and storing each said correction constant;

turning on said radiation source to direct said radiation beams through said chamber when said portion of said chamber contains only air, detecting radiation beams emerging from said chamber and generating response signals thereto, and generating and storing first data representative of said response signals;

placing said target object in said portion of said chamber, turning on said radiation source to direct said radiation beams through said chamber, detecting radiation beams emerging from said chamber and generating response signals thereto, and generating and storing second data representative of said response signals;

differencing said first data and said second data to obtain third data representative of a difference between response signals for each of said detectors, and storing said third data; and differencing said third data and said correction constants for each of said detectors to obtain image data to reconstruct a tomographic image of said target object.

2. The method of claim 1 wherein said correction constants are determined as a function of the difference between data representative of response signals of said detectors when said portion of said chamber contains only air, and when said portion of said chamber contains a reference object having physical characteristics similar to said target object.

3. The method of claim 2 wherein said step of determining a correction constant for each of said detectors comprises the substeps of:

turning on said radiation source to direct said radiation beams through said chamber when said portion of said chamber contains only air, detecting radiation emerging from said chamber, generating response signals thereto, and generating and storing first actual correction data representative of said response signals, placing said reference object in said portion of said chamber, directing said radiation beams through said chamber, detecting radiation emerging from said chamber, generating response signals thereto, generating and storing second actual correction data representative of said response signals; and differencing said first actual correction data and said second actual correction data for each of said detectors to obtain a correction constant for each of said detectors.

4. The method of claim 3 wherein said steps of generating, storing and differencing said first actual and said second actual correction data to obtain said correction constant for each of said detectors is performed a plurality of times to obtain a plurality of correction constants for each said detector, and wherein each of said plurality of correction constants for each said detector is averaged with each other said correction constant for that said detector to obtain an averaged correction constant for that said detector for use in obtaining image data for reconstructing a tomographic image of said target object.

5. The method of claim 4 wherein said portion of said chamber and said reference object have centers which may not be coincident when said reference object is placed in said portion and wherein said radiation source of said tomographic apparatus may be repositioned, said radiation source being repositioned relative to said reference object each of said plurality of times, and wherein said step of obtaining said averaged correction constant for each of said detectors further comprises the following substeps, performed after differencing said first and second actual correction data for each of said detectors each of said plurality of times to obtain said correction constants:

determining a degree of displacement indicative of a distance between each said detector for which a given correction constant is obtained and each said detector for which a said given correction constant is obtained when said center of said portion and said center of said reference object are coincident; and associating said correction constants obtained for each of said detectors with said detectors for which said correction constants are obtained when said center of said portion and said center of said reference object are coincident, as a function of said degree of displacement.

6. The method of claim 5 wherein said degree of displacement is determined using the equation $$S(k) = \frac{\sum_{i=-N}^{+N} i \times P_2(i + (NDET/2), k)}{\sum_{i=-N}^{+N} P_2(i + (NDET/2), k)},$$

where $S(k)$ represents said degree of displacement, for a said detector, N represents a selected number of said radiation beams directed through said portion of said chamber, NDET represents the number of said detectors comprising said apparatus, and where $i$ and $k$ are indices for radiation beam locations relative to said detectors, and for said detector, respectively.

7. The method of claim 6 wherein said step of determining said degrees of displacement further includes the substep of obtaining a smooth function of said degrees of displacement.

8. The method of claim 7 wherein said smooth function of said degrees of displacement obtained using a finite Fourier series according to the equation:

$$S(\theta) = a_0/2 + a_1 \cos\theta + a_2 \sin\theta$$

where $\theta = k\Delta\theta$, $\Delta\theta$ representing an ideal angular separation between said detectors, and where Fourier coefficients are calculated according to the equation:

$$a_n = \frac{1}{\pi} \int S(\theta) \begin{matrix} \cos(n\theta); & n = 0,1 \\ \sin(nk\theta); & n = 2 \end{matrix} d\theta \cong$$

$$\frac{2}{NDET} \times \sum_{K=1}^{NDET} S(k\Delta\theta) \begin{matrix} \cos(nk\Delta\theta); & n = 0,1 \\ \sin(nk\Delta\theta); & n = 2 \end{matrix},$$

where NDET is the numer of detectors 28.

9. The method according to claim 6, wherein said correction constants are associated with non-integer-indexed locations by interpolating between correction constants for said detectors having said integer-indexed locations.

10. The method of claim 3 wherein said first and second actual correction data comprise data representing the LOG of said response signals.

11. The method of claim 2 wherein said step of determining a correction constant for each of said detectors comprises the substeps of:

computing expected response signals for each of said detectors which would be generated in response to radiation beams directed through said chamber when said portion of said chamber contains only air and radiation emerging from said chamber, and generating and storing first expected correction data representative of said expected response signals;

computing expected response signals for each of said detectors which would be generated in response to radiation beams directed through said chamber when said portion of said chamber contains said reference object and radiation emerging from said chamber, and generating and storing second expected correction data representative of said expected response signals; and differencing said first expected data and said second expected data for each of said detectors to obtain a correction constant for each of said detectors.

12. The method of claim 11 wherein said method further includes the step of limiting the radiation passing through said chamber by predetermined amounts at predetermined areas within said chamber, thereby limiting the response signals generated by corresponding detectors positioned to detect radiation emerging from said predetermined areas of said chamber, using a compensation object interposed between said radiation source and said portion of said chamber of said tomographic apparatus, said tomographic apparatus including said compensation object.

13. The method of claim 12 wherein said target object placed in said portion of said chamber is at least a portion of a human patient.

14. The method of claim 13 wherein said correction constants are determined when said reference object is a water cylinder.

15. The method of claim 14 wherein said expected response signals for each of said detectors generated in response to radiation beams directed through said chamber when said portion of said chamber is empty and when said portion of said chamber contains said reference object are computed by performing the following substeps:

obtaining photon energies for photons contained in said radiation beams from said radiation source including a maximum and a minimum photon energy, an X-ray spectral distribution for said radiation source, linear attenuation coefficients for said compensation object and said reference object, and path lengths for said radiation beams through said compensation object and through said reference object; and calculating said expected response signals for when said portion of said chamber is empty according to the following equation:

$$P_A^T(n) = \int_{\epsilon min}^{\epsilon max} s(\epsilon) \times \epsilon \times e^{-\mu(\epsilon)X(r)} d\epsilon,$$

and
calculating said expected response signals for when said portion of said chamber contains said reference object according to the following equation:

$$P_w^T(n) = \int_{\epsilon min}^{\epsilon max} s(\epsilon) \times \epsilon \times e^{-\mu(\epsilon)X(r) - \mu'(\epsilon)X'(r)} d\epsilon,$$

where
$\epsilon$ = photon energy for photons contained in the radiation beams from the source,
$\epsilon_{min}$ = energy of the least energetic photon produced by the source,
$\epsilon_{max}$ = energy of the most energetic photon produced by the source,
$s(\epsilon)$ = energy dependent X-ray spectral distribution,
$\mu(\epsilon)$ = energy dependent linear attenuation coefficient for the compensation (or aluminum) wedge,
$X(n)$ = path length of the ray n through the compensation wedge,
$\mu'(\epsilon)$ = energy dependent linear attenuation coefficient of water,
$X'(n)$ = path length of a ray n through a centered water cylinder.

16. The method according to claim 15 wherein said substep of calculating said expected response signals for when said portion of said chamber is empty and for when said portion of said chamber contains said reference object is performed using a standard discrete numerical integration technique.

17. The method of claim 16 wherein said standard discrete numerical integration technique used for calculating said expected response signals is based on Simpson's Rule, said expected response signals for when said portion of said chamber is empty being evaluated according to the equation:

$$P_A^T(n) = \sum_{i=1}^{N} D(i) \times s(\epsilon_i) \times \epsilon_i \times e^{-\mu(\epsilon_i) \times X(n)},$$ and said expected response signals for when said portion of said chamber contains said reference object being evaluated according to the equation:

$$P_w^T(n) = \sum_{i=1}^{N} D(i) \times s(\epsilon_i) \times \epsilon_i \times e^{-\mu(\epsilon_i) \times X(r) - \mu'(\epsilon_i) \times X'(n)}$$

where N = an odd integer, i = a discrete photon energy in the photon energy interval under consideration from $\epsilon_i$ to $\epsilon_N$, $$D(i) = \begin{cases} \frac{h}{3} & \text{if } i = 1 \text{ or } i = N \\ \frac{4h}{3} & \text{if } i \text{ is even} \\ \frac{2h}{3} & \text{if } i \text{ is odd,} \end{cases}$$

and $$h = \frac{\epsilon max - \epsilon min}{N - 1}.$$

18. The method according to claim 15 or 17 wherein said X-ray spectral distribution is obtained by performing X-ray spectrometry for said radiation source.

19. The method according to claim 15 or 17 wherein said X-ray spectral distribution is mathematically obtained using Bremstrahlung theory.

20. The method according to claim 15 or 17 wherein said X-ray spectral distribution is obtained by analysis of data for attenuation of said radiation beams directed through said chamber.

21. The method according to claim 15 or 17 wherein said linear attenuation coefficients for said compensation object and said reference object are obtained for a photon having energy from discrete experimentally obtained values by using a smooth interpolation method.

22. The method according to claim 21 wherein said smooth interpolation method utilized is cubic spline interpolation.

23. The method according to claim 15 wherein said path length are obtained by geometric analysis.

24. The method of claim 11 wherein said first and second expected correction data comprise data representing the LOG of said expected response signals.

25. The method of claim 2, 6, 8 or 9 wherein said method further includes the step of limiting the radiation passing through said chamber by predetermined areas within said chamber, thereby limiting the response signals generated by corresponding detectors positioned to detect radiation emerging from said predetermined areas of said chamber, using a compensation object interposed between said radiation source and said portion of said chamber of said tomographic apparatus, said tomographic apparatus including said compensation object.

26. The method of claim 25 wherein said radiation source is turned on to direct polychromatic X-ray radiation through said chamber.

27. The method of claim 26 wherein said target object placed in said portion of said chamber is at least a portion of a human patient.

28. The method of claim 27 wherein said correction constants are determined when said reference object is a water cylinder.

29. The method of claim 25 wherein the radiation passing through said chamber is limited using an aluminum compensation object.

30. The method according to claim 1 wherein said tomographic apparatus includes a plurality of radiation sources.

31. The method according to claim 1 wherein said detectors of said tomographic apparatus may be repositioned about said chamber.

* * * * *